(12) United States Patent
Dang et al.

(10) Patent No.: US 9,280,472 B1
(45) Date of Patent: Mar. 8, 2016

(54) CACHING DATA IN A HIGH PERFORMANCE ZONE OF A DATA STORAGE SYSTEM

(71) Applicant: Western Digital Technologies, Inc., Irvine, CA (US)

(72) Inventors: Dean V. Dang, Fountain Valley, CA (US); Colin W. Morgan, Mission Viejo, CA (US); Robert S. Cohn, Newport Coast, CA (US); Theodore E. Deffenbaugh, Coto De Caza, CA (US); Kent W. Gibbons, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 371 days.

(21) Appl. No.: 13/802,183

(22) Filed: Mar. 13, 2013

(51) Int. Cl.
*G06F 12/08* (2006.01)

(52) U.S. Cl.
CPC ........ *G06F 12/0848* (2013.01); *G06F 12/0871* (2013.01)

(58) Field of Classification Search
CPC .................................................... G06F 12/0871
See application file for complete search history.

(56) References Cited

U.S. PATENT DOCUMENTS

| | | | |
|---|---|---|---|
| 6,795,894 B1 | 9/2004 | Neufeld et al. |
| 6,856,556 B1 | 2/2005 | Hajeck |
| 7,099,993 B2 | 8/2006 | Keeler |
| 7,126,857 B2 | 10/2006 | Hajeck |
| 7,430,136 B2 | 9/2008 | Merry, Jr. et al. |
| 7,447,807 B1 | 11/2008 | Merry et al. |
| 7,461,202 B2 | 12/2008 | Forrer, Jr. et al. |
| 7,502,256 B2 | 3/2009 | Merry, Jr. et al. |
| 7,509,441 B1 | 3/2009 | Merry et al. |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,800,856 B1 | 9/2010 | Bennett et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 7,966,450 B2 | 6/2011 | Klein |
| 8,074,017 B2 | 12/2011 | Cavallo |
| 8,078,918 B2 | 12/2011 | Diggs et al. |

(Continued)

OTHER PUBLICATIONS

U.S. Appl. No. 11/950,324, filed Dec. 4, 2007, 21 pages.

*Primary Examiner* — Edward Dudek, Jr.

(57) ABSTRACT

A combination of a host system and a storage system is disclosed that facilitates improved responsiveness of the host system to user requests. In one embodiment, the host system includes a cache management module, a partitioning module, and a driver. The cache management module determines write data to cache to a dedicated zone of a hard disk media of the storage system. The partitioning module partitions the hard disk media into one partition including the dedicated zone and another partition not including the dedicated zone. The driver transmits storage access commands to the storage system to cache data in and retrieve cached data from the one partition. Thereby, the host system can access the write data from the hard disk media more quickly than if the write data were cached in and accessed from another zone of the hard disk media.

20 Claims, 5 Drawing Sheets

(56) References Cited

U.S. PATENT DOCUMENTS

| | | |
|---|---|---|
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,281,076 B2 | 10/2012 | Hashimoto et al. |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,745,277 B2 | 6/2014 | Kan |
| 2003/0028719 A1* | 2/2003 | Rege ............... 711/112 |
| 2004/0088479 A1 | 5/2004 | Hall |
| 2005/0066121 A1* | 3/2005 | Keeler ............ 711/113 |
| 2006/0080501 A1 | 4/2006 | Auerbach et al. |
| 2006/0253650 A1* | 11/2006 | Forrer et al. ....... 711/113 |
| 2008/0222353 A1* | 9/2008 | Nam et al. ......... 711/113 |
| 2010/0174849 A1 | 7/2010 | Walston et al. |
| 2010/0250793 A1 | 9/2010 | Syu |
| 2011/0099323 A1 | 4/2011 | Syu |
| 2011/0283049 A1 | 11/2011 | Kang et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0300329 A1 | 11/2012 | Benhase et al. |
| 2012/0300336 A1 | 11/2012 | Benhase et al. |
| 2012/0324191 A1 | 12/2012 | Strange et al. |
| 2013/0132638 A1 | 5/2013 | Horn et al. |
| 2013/0132664 A1* | 5/2013 | Benhase et al. ...... 711/112 |
| 2013/0145106 A1 | 6/2013 | Kan |
| 2013/0290793 A1 | 10/2013 | Booth et al. |
| 2014/0059405 A1 | 2/2014 | Syu et al. |
| 2014/0115427 A1 | 4/2014 | Lu |
| 2014/0133220 A1 | 5/2014 | Danilak et al. |
| 2014/0136753 A1 | 5/2014 | Tomlin et al. |

\* cited by examiner

CACHING DATA IN A HIGH PERFORMANCE ZONE OF A DATA STORAGE SYSTEM

BACKGROUND

1. Technical Field

This disclosure relates to computer systems including host systems and data storage systems. More particularly, the disclosure relates to caching data in a high performance zone of data storage systems, such as hard disk drives and hybrid drives.

2. Description of the Related Art

Users of host systems, such as personal computers, find that operating the host systems can be frustrating due to a sluggish responsiveness by the systems to user requests. For example, when users turn on host systems, the host systems can be slow to transition from a power-off state to a power-on state where the host systems are fully operative for the users. Users may, in some cases, wait one or two minutes after turning on the host systems before the users can request to run an application on the host systems. In addition, even after users request to run the application, the host systems may take another 10 to 20 seconds to load the application before the users can use the application.

BRIEF DESCRIPTION OF THE DRAWINGS

Systems and methods that embody the various features of the invention will now be described with reference to the following drawings, in which.

DETAILED DESCRIPTION OF SPECIFIC EMBODIMENTS

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

To improve the response time of a host system to user requests, the host system can cache data likely to be accessed for a user to a data cache. The data cache can be located in a storage medium having a faster access time than other storage medium used to store data for the host system. As a result, the host system can retrieve a significant amount of data from the data cache in the storage medium having the faster access time rather than from the other storage medium, thereby increasing the responsiveness of the host system to requests of the user.

In some implementations, a host system can store host system data in a storage system that includes a non-volatile solid-state memory array and a hard disk media. The host system can use the memory array as a data cache for caching data likely to be accessed data for the user, while using the hard disk media to store other data for the host system. Since the memory array can offer a faster access time than the hard disk media in some cases, the memory array may be a higher performance zone of memory than the hard disk media and preferred for use as the data cache.

In some embodiments of the present invention, a host system can store host system data in a storage system that includes a hard disk media. The host system can use a dedicated zone of the hard disk media as a data cache for caching data likely to be accessed data for the user, while using a remainder of the hard disk media to store other data for the host system. The dedicated zone can be a zone that includes or consists of multiple data sectors of the hard disk media that are contiguous with one another, enabling faster reading from the dedicated zone by limiting the seek range of the head while reading. Additionally or alternatively, the dedicated zone can be a zone that includes part of an outside diameter (OD) zone of the hard disk media that has a faster data read rate than other zones of the hard disk media. Advantageously, the host system can realize improved response time to user requests without the storage system including both the hard disk media and a non-volatile solid-state memory array.

In some embodiments of the present invention, a host system can store host system data in a storage system that includes various types of memories having different performance characteristics. The host system can use a high performance memory or zone as a data cache for caching data likely to be accessed data for the user, while using the other memories or zones of the memories to store other data for the host system. If the high performance memory becomes inoperative or the performance degrades below a threshold, the host system can use a different high performance memory or zone for caching data likely to be accessed for the user. For instance, the host system can initially cache data to a non-volatile solid-state memory array of the storage system. However, once performance of the memory array falls below a threshold metric, the host system can instead cache data to a zone of the hard disk media that includes or consists of multiple data sectors of the hard disk media that are contiguous with one another.

System Overview

Figure 1A:
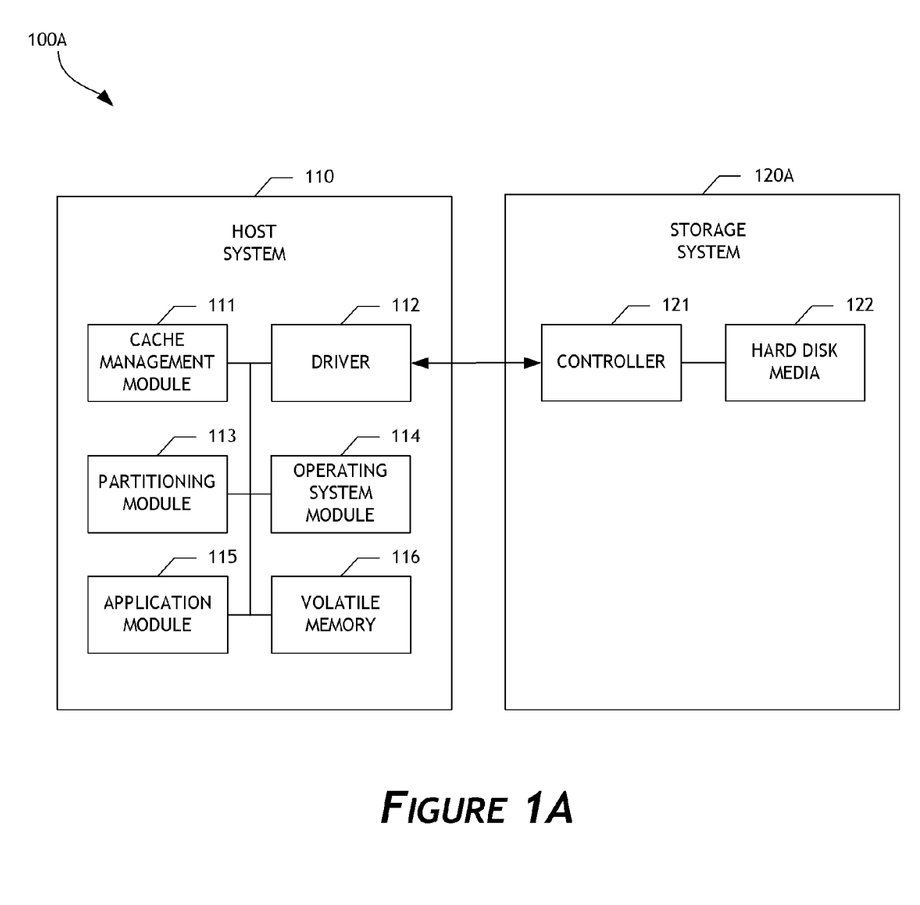
FIG. 1A illustrates a combination of a host system and a storage system according to one embodiment of the invention.

FIG. 1A illustrates a combination 100A of a host system 110 and a storage system 120A according to one embodiment of the invention. As is shown, the host system 110 includes a cache management module 111, a driver 112 (e.g., device driver or kernel level driver), a partitioning module 113, an operating system module 114, an application module 115 (e.g., user level application), and a volatile memory 116 (e.g., DRAM). The storage system 120A (e.g., a hard disk drive) includes a controller 121 and a hard disk media 122.

The cache management module 111 can determine host system data to cache to a memory of the host system 110 or storage system 120A. For example, the cache management module 111 can determine copies of data, such as application or operating system data of the host system 110, to store in a high performance zone of memory having relatively a quick retrieval time for stored data. In some embodiments, the cache management module 111 can utilize an intelligent process to select data to cache in the memory based on an observed frequency or recency of access of data by the user of the host system 110 or based on hints from the operating system module 114 or the application module 115. When data selected by the cache management module 111 is cached, the end-user experience of the host system 110 can be improved because the cached data may be accessible more quickly or easily than data stored in other areas of memory of the host system 110 or storage system 120A.

The driver 112 can receive messages from the other components of the host system 110. Based on the received messages from the other components, the driver 112 can communicate storage access commands and/or accompanying host system data to the storage system 120A. The storage access commands can include, for example, read data or write data commands issued for particular logical addresses (e.g., LBAs) of the storage system 120A. In response to the read data commands transmitted to the storage system 120A, the driver 112 can receive stored data from the storage system 120A. In some embodiments, the driver 112 assigns particular storage access commands and/or host system data to partitions of the storage system 120A based on partition identifiers (IDs) in a Master Boot Record (MBR) that correspond to groups of logical addresses of the storage system 120A. In one embodiment, the driver 112 is loaded by the operating system of the host system 110.

The driver 112, in conjunction with the cache management module 111, can maintain a zone of the hard disk media 122 dedicated to caching data for the host system 110. The cache management module 111 can select data to cache to the dedicated zone, and the driver 112, in turn, can issue write data commands to cache the selected data to a dedicated cache partition of the hard disk media 122 that includes the dedicated zone. When the host system 110 retrieves the selected data from the storage system 120A, the driver 112 can issue read data commands to retrieve the cached data from the dedicated cache partition rather than another partition of the storage system 120A. In one embodiment, the driver 112 and the cache management module 111 are integrated as a single module/driver.

The controller 121 can be configured to receive data and/or storage access commands from the driver 112 of the host system 110. The storage access commands communicated by the driver 112 can include the write data and read data commands issued by the host system 110. Read and write commands can specify a logical address used to access the hard disk media 122. The controller 121 can execute the received commands in the hard disk media 122.

The storage system 120A can store data communicated by the host system 110. In other words, the storage system 120A can act as memory storage for the host system 110. To facilitate this function, the controller 121 can implement a logical interface. The logical interface can present the memory of the hard disk media 122 as a set of logical addresses (e.g., contiguous addresses) where host system data can be stored. Internally, the controller 121 can map logical addresses to various physical locations or addresses in the hard disk media 122. In some embodiments, particular logical addresses correspond to certain memory locations of the hard disk media 122, such as the physical locations or zones of memory as discussed with respect to FIG. 2. As a result, the host system 110 can issue storage access commands for execution to particular zones of the hard disk media 122 based on a logical address.

The partitioning module 113 can partition the hard disk media 122 and divide the hard disk media 122 into multiple logical storage units, which can then each be treated by the host system 110 as if they are separate or independent disks. In addition, the partitioning module 113 can assign certain ranges of LBAs to particular partitions, and the LBAs correspond to physical zones of the hard disk media. For instance, the partitioning module 113 can assign LBAs corresponding to one physical zone (e.g., an OD zone of the hard disk media 122) to a particular partition and not assign LBAs corresponding to another physical zone to one partition of the hard disk media 122. By partitioning the hard disk media 122 to include one or more physical zones, the partitioning module 113 can enable the host system 110 to designate one or more zones or regions of the hard disk media 122 for specific or dedicated uses, such as for caching data for the host system 110, storing application data, or storing operating system data. In some embodiments, each zone having a dedicated use can include less than about 1%, 5%, 10%, or 25% of the data sectors of a storage medium. For example, a zone dedicated to caching data for the host system 110 can includes less than about 10% of the data sectors of hard disk media 122. The use of a dedicated zone for caching limits the motion of the head while seeking within the zone, and thus increases read performance and random access performance. In one embodiment, the use of such an arrangement enables a hard disk drive to have a similar performance as a hybrid drive with a hard disk media and a non-volatile solid-state memory cache, but without the additional cost of having the solid-state memory cache.

The operating system module 114 can run the operating system for the host system 110 and control general operations of the host system 110. The operating system module 114 can additionally provide hints of data likely to be accessed by the operating system module 114 to the cache management module 111 so that the cache management module 111 can better determine data to cache for the host system 110. In some embodiments, the operating system module 114 stores operating system data in a dedicated partition of the hard disk media 122. In other embodiments, the operating system module 114 does not store operating system data in a dedicated partition.

The application module 115 can run applications on the host system 110 that enable the host system 110 to perform specific or custom functions. In addition, the application module 115 can provide hints of data likely to be accessed by the application module 115 to the cache management module 111 so that the cache management module 111 can better determine data to cache for the host system 110. In some embodiments, the application module 115 stores application data in a dedicated partition of the hard disk media 122. In other embodiments, the application module 115 does not store application data in a dedicated partition.

The volatile memory 116 can store data for the other components of the host system 110. For example, the driver 112 can issue storage access commands to the volatile memory 116 to cache data for the host system 110.

Figure 1B:
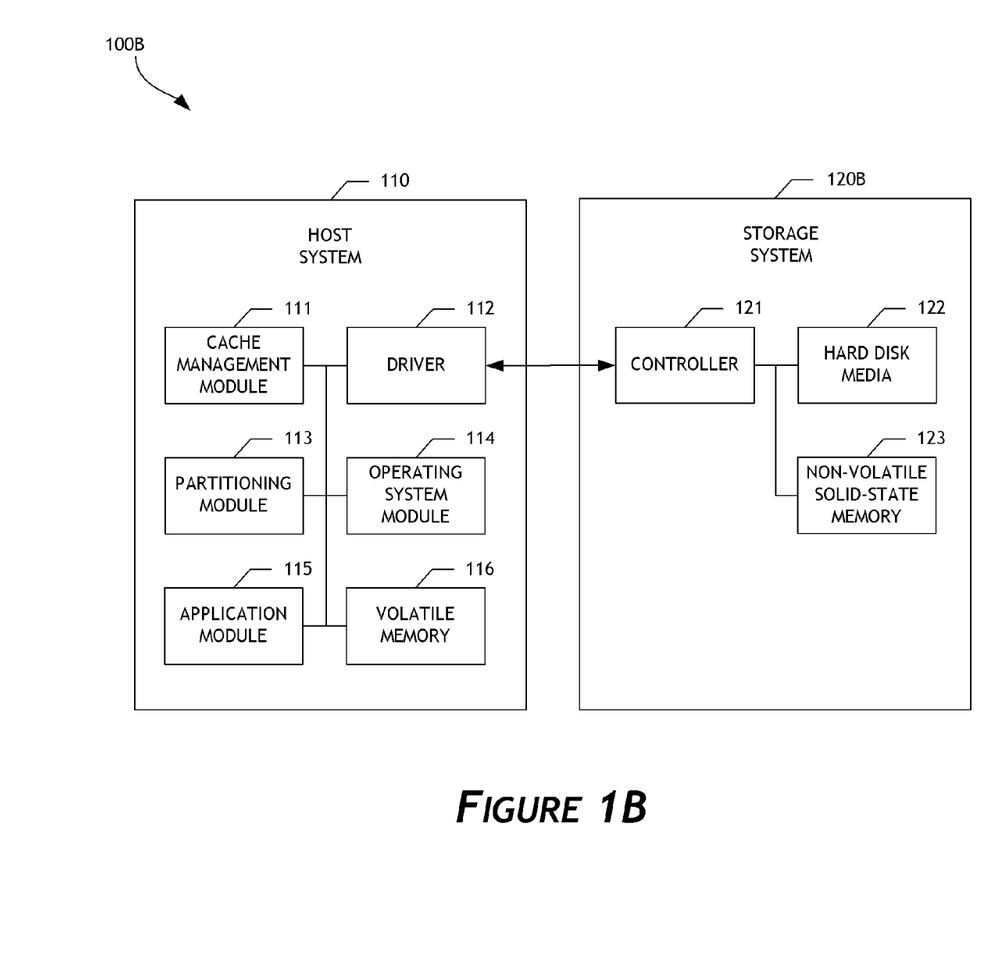
FIG. 1B illustrates a combination of a host system and a storage system according to one embodiment of the invention.

FIG. 1B illustrates a combination 100B of a host system 110 and a storage system 120B according to one embodiment of the invention. The components of the combination 100B are similar to the components of the combination 100A; however, the storage system 120A is replaced with storage system 120B. The storage system 120B (e.g., hybrid hard drive) includes a controller 121 and a hard disk media 122, as well as a non-volatile solid-state memory array 123. The non-volatile solid-state memory array 123 can be implemented using NAND flash memory devices. Other types of solid-state memory devices can alternatively be used, such as array of flash integrated circuits, Dynamic random-access memory (DRAM), Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NOR memory, EEPROM, Ferroelectric Memory (FeRAM), Magnetoresistive RAM (MRAM), other discrete NVM (non-volatile memory) chips, or any combination thereof.

The controller 121 of the storage system 120B can be configured to receive data and/or storage access commands from the driver 112 of the host system 110. Read and write commands from the driver 122 can specify a logical address used to access the hard disk media 122 or the non-volatile solid-state memory array 123. The controller 121 can map logical addresses to various physical locations or addresses in the hard disk media 122 and the non-volatile solid-state memory array 123 and accordingly execute the received commands in the hard disk media 122 or the non-volatile solid-state memory array 123 based on the specified logical address.

Figure 2:
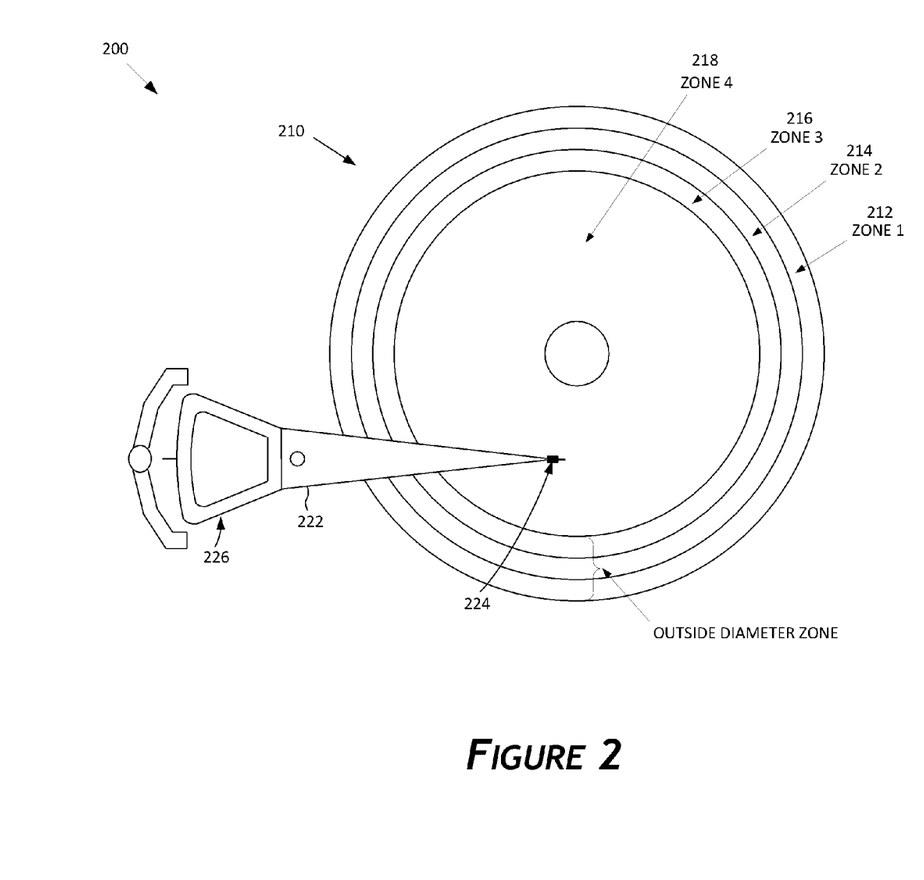
FIG. 2 illustrates a hard disk drive according to one embodiment of the invention.

FIG. 2 illustrates a hard disk drive 200 according to one embodiment of the invention. The hard disk drive 200 comprises a disk or platter 210, a controller (not shown), an actuator arm 222, and a physical head 224 actuated radially over the disk 210 and connected to a distal end of the actuator arm 222. The disk 210 comprises multiple data tracks, each data track including multiple data sectors. A voice coil motor (VCM) 226 rotates the actuator arm 222 about a pivot in order to position the physical head 224 radially over the disk 210.

Because the disk 210 may be rotated at a constant angular velocity, the data rate can increase toward the outer diameter tracks as the linear velocity is higher in relation to that of the inner diameter tracks (where the radius is smaller). In addition, tracks can be grouped into a number of physical zones, wherein the data rate is substantially constant or within a certain range across a zone, and is increased from the inner diameter zones to the outer diameter zones. As is illustrated in FIG. 2, data tracks are grouped into four physical zones 212 (Zone 1), 214 (Zone 2), 216 (Zone 3), 218 (Zone 4). Each illustrated data zone includes and consists of data sectors of the disk 210 that are contiguous with one another. Zone 4 218 is located closest to the inner diameter of the disk, and Zone 1 212 is located closest to the outer diameter of the disk. Zone 1 212, Zone 2 214, and Zone 3 216 together can form an OD zone, which may, in some embodiments, be a high performance zone of the hard disk drive 200 that enables faster reading of the data than from other zones of the disk 210 like the Zone 4 218. Moreover, while four zones are illustrated in FIG. 2, those of ordinary skill in the art will appreciate that the disk 210 can comprise any suitable number of zones.

Although each of the four zones illustrated in FIG. 2 includes and consists of data sectors of the disk 210 that are contiguous with one another, the zones may not include or consist of data sectors of the disk 210 that are contiguous with one another. For example, Zone 2 214 and Zone 4 218 could together form one combined zone having data sectors that are not contiguous. However, in some embodiments, one or more zones having dedicated uses advantageously include or consist of data sectors of the disk 210 that are contiguous with one another. The contiguous location of data sectors can beneficially reduce an amount of time used to access data from the data sectors since the actuator arm 222 may move less in order to position the physical head 224 over the disk 210 to read data from the data sectors. Thus, in some embodiments, a high performance zone of the hard disk drive 200 can be a zone of the disk 210 that includes or consists of multiple data sectors of the disk 210 that are contiguous with one another.

Data Caching

Figure 3:
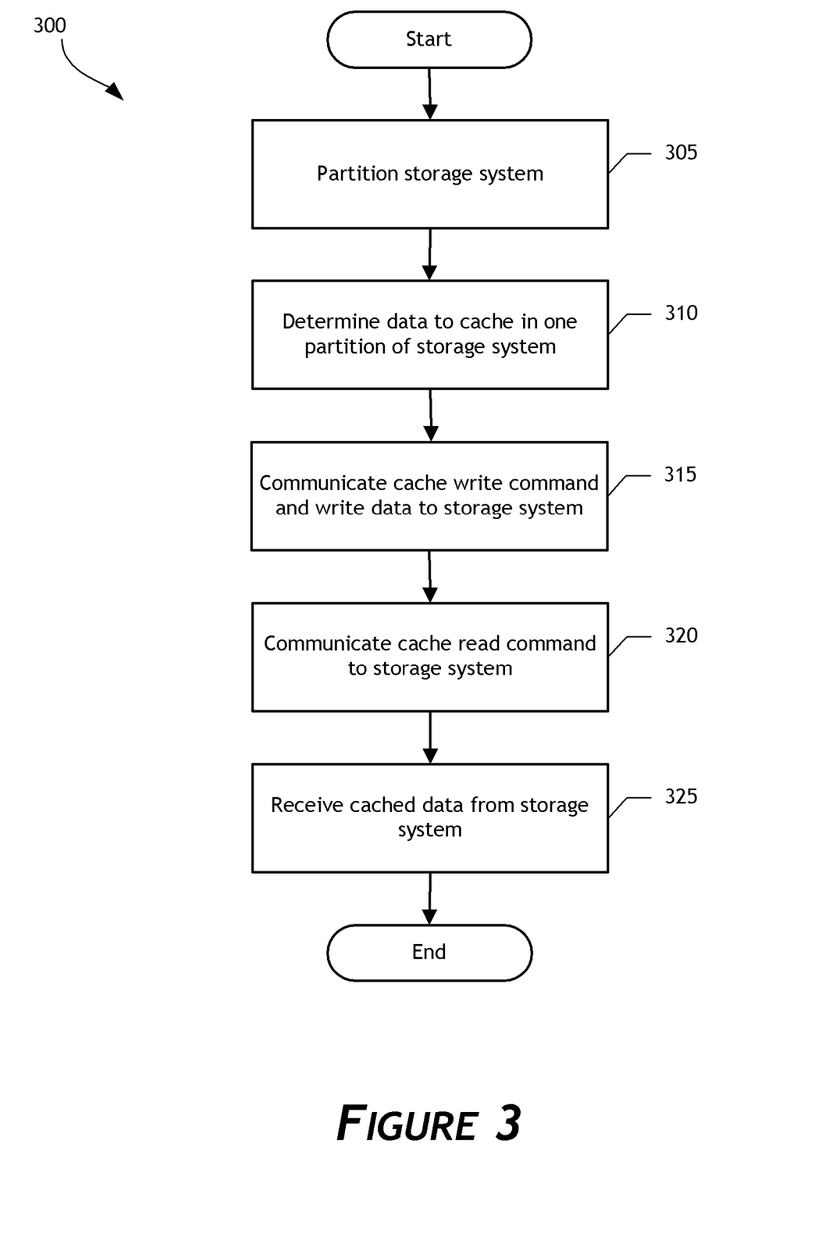
FIG. 3 illustrates a flow diagram of a process for caching data in a high performance zone of a storage system according to one embodiment of the invention.

FIG. 3 illustrates a flow diagram of a process 300 for caching data in a high performance zone of a storage system according to one embodiment of the invention. The process 300 can be executed collectively and/or individually by the cache management module 111, the driver 112, and the partitioning module 113 of the host system 110 of FIG. 1 or 2, for example.

At block 305, the process 300 partitions a storage system. For example, the process 300 can partition a hard disk media of the storage system into multiple partitions. Each partition can include or exclude one or more zones, such as physical zones, of the hard disk media. In addition, the process 300 can assign one or more other storage media, such as a non-volatile solid-state memory array or another hard disk media, to a particular partition of the storage media. In some embodiments, the process 300 partitions the storage system into one partition dedicated to caching data for a host system, another partition dedicated to storing operating system data for the host system, and yet another partition for storing application data for the host system. Either or both of the partitions dedicated to caching data for the host system and storing operating system data can include one or more high performance zones of the hard disk media to enable quicker access of this data than if the data were stored in other zones of the storage system. For instance, the partition dedicated to caching data for the host system can include Zone 1 212, and the partition dedicated to storing operating system data can include Zone 2 214.

At block 310, the process 300 determines data to cache in one partition of the storage system, such as a partition dedicated to caching data for the host system. The process 300 can determine what data to cache to the partition by selecting data likely to be accessed for a user of the host system so that the user experience for the user of the host system can be improved. For example, the process 300 can determine data to cache based on a frequency or recency of when the data was accessed by the user or based on hints from an operating system or applications running on the host system.

At block 315, the process 300 communicates a cache write command and write data to the storage system. The cache write command can indicate to the storage system to cache the write data in one region of the storage system, such as a dedicated cache zone or partition of the hard disk media or the non-volatile solid-state memory array.

At block 320, the process 300 communicates a cache read command to the storage system. The cache read command can indicate to the storage system to read the cached write data from a particular partition of the storage system, such as the dedicated cache zone or partition of the hard disk media or the non-volatile solid-state memory array.

At block 325, the process 300 receives cached data from the storage system. The process 300 can receive the cached data in response to the cache read commands transmitted at block 320.

Figure 4:
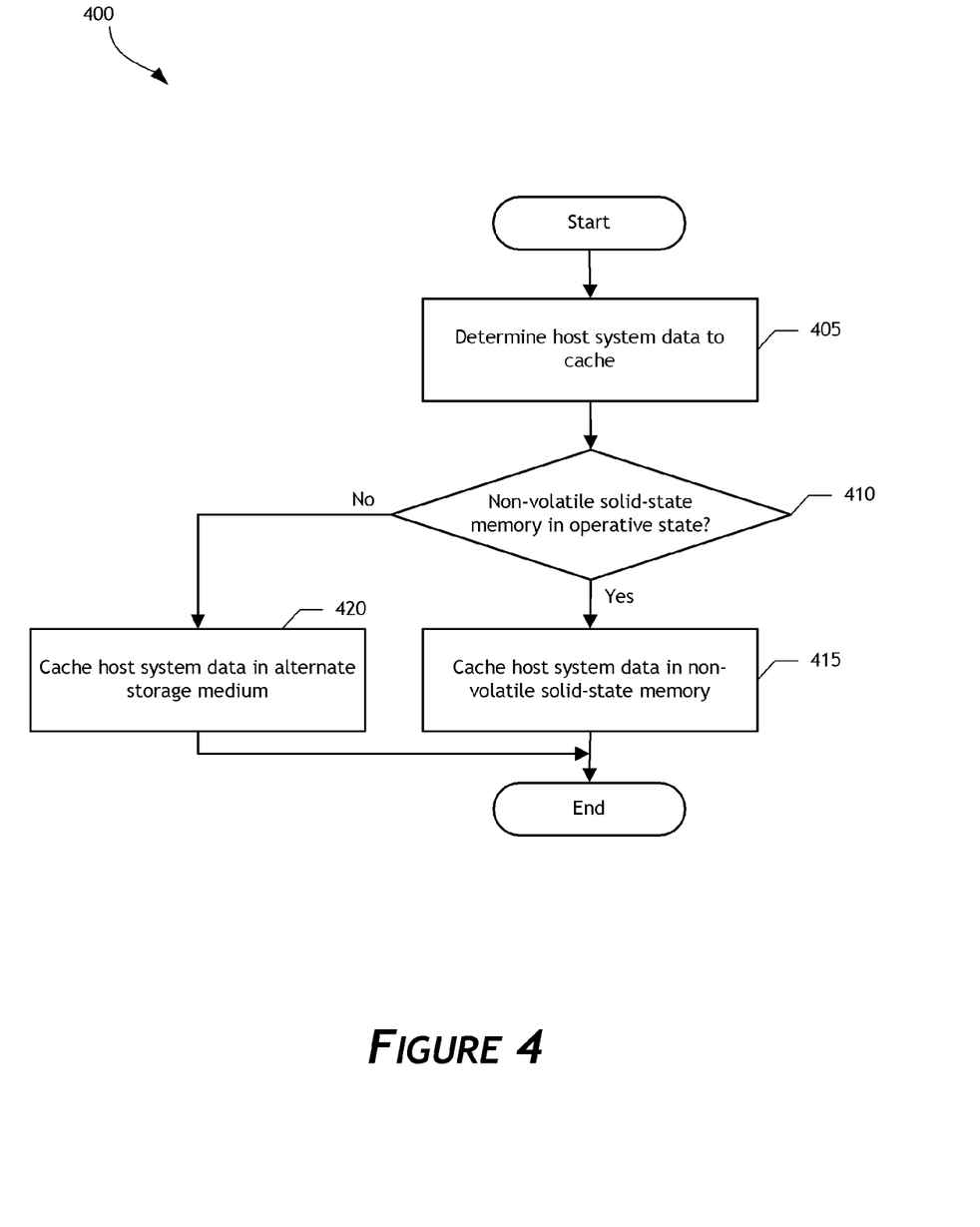
FIG. 4 illustrates another flow diagram of a process for caching data in a high performance zone of a storage system according to one embodiment of the invention.

FIG. 4 illustrates another flow diagram of a process 400 for caching data in a high performance zone of a storage system according to one embodiment of the invention. In one embodiment, the process 400 can be executed collectively and/or individually by the cache management module 111 and the driver 112 of the host system 110 and/or the controller 121 of the storage system 120B, for example.

At block 405, the process 400 determines host system data to cache to a high performance zone of memory. For example, the process 400 can determine data to cache based on a frequency or recency of when the data was accessed by the user or based on hints from an operating system or applications running on the host system.

At block 410, the process 400 determines whether a non-volatile solid-state memory array of a storage system is in an operative or a non-operative state. The process 400 can make this determination, for instance, based on whether the memory array can be powered or whether performance by the non-volatile solid-state memory array satisfies a reliability metric (e.g., a number of blocks marked as unusable is below a threshold, or a number of read errors when reading a test pattern is below a threshold).

If the non-volatile solid-state memory array is in the operative state, the process 400 moves to block 415. At block 415, the decision is made to cache host system data in the non-volatile solid-state memory array of the storage system. For example, in some embodiments, if the controller 121 of the storage system 120B determines that the non-volatile solid-state memory array 123 is in the operative state, the controller 121 caches data for the host system 110 in the non-volatile solid-state memory array 123. In some embodiments, if the driver 112 of the host system 110 determines that the non-volatile solid-state memory array 123 is in the operative state, the driver 112 issues appropriate storage access commands. Moreover, an indication that the data are cached in the non-volatile solid-state memory array 123 can be stored at the host system 110 or in the storage system 120B so that the cached data can be correctly read.

If the non-volatile solid-state memory array is in the non-operative state, the process 400 moves to block 420. In one embodiment, when the non-volatile solid-state memory array has reached a point where it is in a read-only mode (otherwise still accessible), it is deemed to be in the non-operative state. In another embodiment, the non-volatile solid-state memory array may be deemed to be in the non-operative state when its reliability metric reaches or falls below a threshold. At block 420, the decision is made to cache host system data in an alternate storage medium. The alternate storage medium can include a local storage of the host system (e.g., the volatile memory 116) or other storage medium of the storage system (e.g., another non-volatile solid-state memory array or a partition of a hard disk media). This decision can be made by the controller 121 of the storage system 120B or by the driver 112 of the host system 110, for instance. When the decision is made by the controller 121, the controller 121 can select to cache the data in another high performance zone of the storage system 120B, such as a high performance zone of the hard disk media 122. When the decision is made by the driver 112, the driver 112 can issue appropriate storage access commands to set up a cache partition in the alternate storage medium accessible to the driver so that the data are stored in the alternate storage medium. The alternative storage medium may be the volatile memory 116 or a partition including a high performance zone of the hard disk media 122.

In some embodiments, since the non-volatile solid-state memory array can be a preferred memory or quicker access memory of the memories included in the host system or the storage system, the non-volatile solid-state memory array can be the default high performance zone for caching data for the host system as illustrated in FIG. 4. However, in other embodiments, another storage medium can be the preferred high performance zone (e.g., an OD zone of a hard disk media, a zone of the hard disk media that includes or consists of multiple data sectors of the hard disk media that are contiguous with one another, or a zone of memory local to the host system) for caching data for the host system. Accordingly, in such implementations, unless the another storage medium is unavailable or non-operative, the decision can be made to cache host system data in the another storage medium.

Other Variations

Those skilled in the art will appreciate that in some embodiments, other types of communications can be implemented between system components. Further, additional system components can be utilized, and disclosed system components can be combined or omitted. For example, the functionality of the cache management module 111 can implemented by the driver 112 and vice versa. In addition, the actual steps taken in the disclosed processes, such as the processes 300 and 400 illustrated in FIGS. 3 and 4, may differ from those shown in the figures. Depending on the embodiment, certain of the steps described above may be removed, others may be added.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. If implemented in software, the functions can be stored as one or more instructions on a computer-readable medium. A storage media can be any available media that can be accessed by a computer, such as RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, the features and attributes of the specific embodiments disclosed above may be combined in different ways to form additional embodiments, all of which fall within the scope of the present disclosure.

Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A host system that communicates storage access commands to a storage system including a hard disk media, the host system comprising:
a cache management module configured to determine write data to cache to a first zone of a hard disk media of a storage system, the first zone comprising a zone of the hard disk media dedicated to caching the write data from the host system;
a partitioning module configured to partition the hard disk media into a first partition including the first zone and a second partition not including the first zone; and
a driver configured to:
communicate cache write commands and the write data to a controller of the storage system, the cache write commands indicating to the controller to cache the write data in the first partition, communicate cache read commands to the controller, the cache read commands indicating to the controller to read the cached write data from the first partition, and receive from the controller the cached write data stored in the first partition in response to communicating the cache read commands, wherein the cache management module, the partitioning module, and the driver are separate from the storage system.

2. The host system of claim 1, wherein the first zone is part of an outside diameter (OD) zone of the hard disk media.

3. The host system of claim 1, wherein the first zone consists of a plurality of data sectors of the hard disk media that are contiguous with one another.

4. The host system of claim 3, wherein the first zone comprises less than 10% of the data sectors of the hard disk media.

5. The host system of claim 4, wherein the cache management module is configured to determine whether to store in the first partition a copy of portions of data stored in the second partition.

6. The host system of claim 1, wherein the cache management module is configured to determine whether to cache the write data based on a frequency and a recency of when a user of the host system accessed the write data.

7. The host system of claim 1, further comprising:
an application module configured to store user application data; and
an operating system module configured to store operating system data,
wherein the partitioning module is further configured to partition the hard disk media into a third partition including a second zone of the hard disk media and not including the first zone, the first and second partitions not including the second zone,
wherein the application module is configured to communicate the user application data to the controller thereby causing the controller to store the user application data in the second partition, and the operating system module is configured to communicate the operating system data to the controller thereby causing the controller to store the operating system data in the third partition, and
wherein the application module and the operating system module are separate from the storage system.

8. The host system of claim 7, wherein the cache management module is configured to determine whether to store a copy of portions of the operating system data or the user application data in the first partition, and
wherein the first and second zones are part of an outside diameter (OD) zone of the hard disk media.

9. The host system of claim 1, wherein the cache management module is part of the driver.

10. In a host system comprising a partitioning module and a driver, a method of caching data, the method comprising:
partitioning, using the partitioning module, a hard disk media of a storage system into a first partition and a second partition, the first partition including a first zone of the hard disk media dedicated for caching write data for the host system, the second partition not including the first zone;
communicating, using the driver, cache write commands and write data to a controller of the storage system, the cache write commands indicating to the controller to cache the write data in the first partition;

communicating, using the driver, cache read commands to the controller, the cache read commands indicating to the controller to read the cached write data from the first partition; and receiving from the controller, using the driver, the cached write data read from the first partition in response to communicating the cache read commands, wherein the partitioning module and the driver are separate from the storage system.

11. The method of claim 10, further comprising:
partitioning, using the partitioning module, the hard disk media into a third partition including a second zone of the hard disk media and not including the first zone;
storing, using an application module of the host system, user application data in the second partition; and
storing, using an operating system module of the host system, operating system data in the third partition,
wherein the first and second partitions do not include the second zone, and the application module and the operating system module are separate from the storage system.

12. The method of claim 11, further comprising determining, using a cache management module of the host system, whether to cache the write data in the first partition based on (i) hints from an operating system of the host system and (ii) a frequency and a recency of when a user of the host system accessed the write data, the cache management module being separate from the storage system.

13. The method of claim 11, wherein the first zone consists of a first plurality of data sectors of the hard disk media that are contiguous with one another, and the second zone consists of a second plurality of data sectors of the hard disk media that are contiguous with one another.

14. The method of claim 11, wherein the first and second zones are part of an outside diameter (OD) zone of the hard disk media.

15. A non-transitory computer readable medium comprising executable instructions that, when executed by a processor of a host system, cause the processor to:
designate a region of a hard disk media of a hard disk drive (HDD) as dedicated for caching write data for the host system, the write data being more quickly accessible by the processor from the designated region than from another region of the hard disk media;
communicate cache write commands and the write data to a controller of the HDD, the cache write commands indicating to the controller to cache the write data in the designated region;
communicate cache read commands to the controller, the cache read commands indicating to the controller to read the cached write data from the designated region; and
receive from the controller the cached write data stored in the designated region in response to communicating the cache read commands,
wherein the processor is separate from the HDD.

16. The non-transitory computer readable medium of claim 15, wherein the designated region is part of an outside diameter (OD) zone of a hard disk media.

17. A storage system configured to cache data for a host system, the storage system comprising:
a data storage comprising a non-volatile solid-state memory array and a hard disk media; and
a controller configured to:
maintain a data cache for a host system in a high performance zone of the data storage, the high performance zone including the non-volatile solid-state memory array and a first zone of the hard disk media, receive cache write commands and write data from a driver of the host system, the cache write commands indicating to cache the write data in the high performance zone, receive cache read commands the driver, the cache read cache commands indicating to read the cached write data from the high performance zone and communicate the cached write data read from the high performance zone to the driver, determine whether the non-volatile solid-state memory array is in an operative state or a non-operative state, when the non-volatile solid-state memory array is in the operative state, (i) cache the write data in the non-volatile solid-state memory array in response to receiving the cache write commands and (ii) read the cached write data from the non-volatile solid-state memory array in response to receiving the cache read commands, and when the non-volatile solid-state memory array is in the non-operative state, (i) cache the write data in the first zone in response to receiving the cache write commands and (ii) read the cached write data from the first zone in response to receiving the cache read commands, wherein the controller is separate from the host system.

18. The storage system of claim 17, wherein the operative state comprises a state where performance by the non-volatile solid-state memory array satisfies a reliability metric, and the non-operative state comprises a state where performance by the non-volatile solid-state memory array does not satisfy the reliability metric.

19. The storage system of claim 17, wherein the first zone comprises a zone of the hard disk media dedicated to caching the write data from the host system.

20. A host system configured to communicate with a storage system including a controller and a non-volatile solid-state memory array, the host system comprising:

a data storage; and a driver configured to:
  determine whether the non-volatile solid-state memory array is in an operative state or a non-operative state,
  in response to determining that the non-volatile solid-state memory array is in the operative state:
    communicate cache write commands and write data to the controller, the cache write commands indicating to the controller to cache the write data in the non-volatile solid-state memory array,
    communicate cache read commands to the controller, the cache read commands indicating to the controller to read the cached write data from the non-volatile solid-state memory array, and
    receive from the controller the cached write data stored in the non-volatile solid-state memory array in response to communicating the cache read commands to the controller, and
  in response to determining that the non-volatile solid-state memory array is in the non-operative state:
    communicate the cache write commands and the write data to the data storage, the cache write commands indicating to the data storage to cache the write data in the data storage,
    communicate the cache read commands to the data storage, the cache read commands indicating to the data storage to read the cached write data from the data storage, and
    receive from the data storage the cached write data stored in the data storage in response to communicating the cache read commands to the data storage,
  wherein the data storage and the driver are separate from the storage system.

* * * * *